United States Patent
Hamilton, Jr. et al.

(10) Patent No.: US 6,542,187 B1
(45) Date of Patent: Apr. 1, 2003

(54) CORRECTING FOR CHROMINANCE INTERPOLATION ARTIFACTS

(75) Inventors: John F. Hamilton, Jr., Rochester, NY (US); James E. Adams, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/112,555

(22) Filed: Jul. 9, 1998

(51) Int. Cl.[7] ............ H04N 9/68; H04N 5/208; G03F 3/08; G06K 9/40
(52) U.S. Cl. ............ 348/234; 348/235; 348/252; 358/520; 382/260
(58) Field of Search .......... 348/232, 252, 348/253, 607, 609, 624, 631, 236, 392.1, 234, 235; 382/163, 260, 300; 358/520

(56) References Cited

U.S. PATENT DOCUMENTS

| | | | | |
|---|---|---|---|---|
| 5,142,592 A | * | 8/1992 | Moler | 382/22 |
| 5,633,678 A | * | 5/1997 | Parulski et al. | 348/232 |
| 5,652,621 A | * | 7/1997 | Adams, Jr. et al. | 348/272 |
| 5,790,269 A | * | 8/1998 | Masaki et al. | 382/266 |
| 5,978,511 A | * | 11/1999 | Horiuchi et al. | 382/153 |
| 6,091,862 A | * | 7/2000 | Okisu | 382/300 |
| 6,125,201 A | * | 9/2000 | Zador | 382/163 |
| 6,175,430 B1 | * | 1/2001 | Ito | 348/234 |
| 6,185,320 B1 | * | 2/2001 | Bick et al. | 382/132 |
| 6,195,459 B1 | * | 2/2001 | Zhu | 382/176 |
| 6,343,146 B1 | * | 1/2002 | Tsuruoka et al. | 382/163 |
| 6,408,103 B1 | * | 6/2002 | Gallagher et al. | 358/520 |

* cited by examiner

Primary Examiner—Wendy R. Garber
Assistant Examiner—Lin Ye
(74) Attorney, Agent, or Firm—Raymond L. Owens

(57) ABSTRACT

A method for correcting chrominance interpolation artifacts in a digital color image having color pixels in which each colored pixel is expressed as one luminance and two chrominance color values including computing a test value at each pixel which indicates the presence of a high contrast luminance feature, and adjusting the chrominance values at pixels in accordance with the computed test value to correct for chrominance interpolation artifacts.

4 Claims, 4 Drawing Sheets

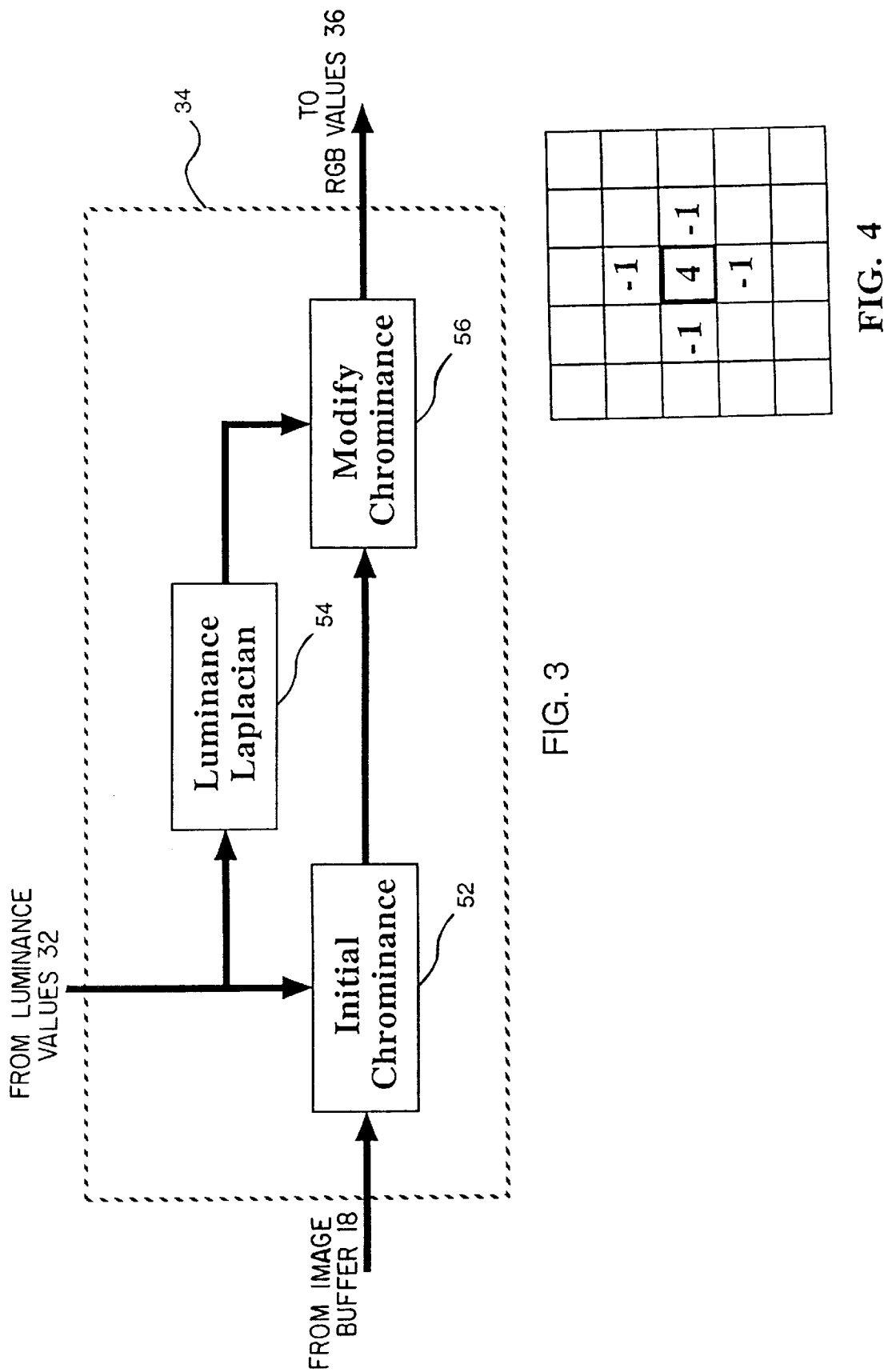

CORRECTING FOR CHROMINANCE INTERPOLATION ARTIFACTS

CROSS REFERENCE TO RELATED APPLICATIONS

Reference is made to commonly assigned U.S. patent application Ser. No. 09/096,632, filed Jun. 12, 1998, entitled "Computing Color Specification (Luminance and Chrominance) Values for Images" to John F. Hamilton, Jr. et al. and U.S. patent application Ser. No. 09/112,554 filed Jul. 9, 1998 entitled "Smoothing a Digital Color Image Using Luminance Values" to John F. Hamilton, Jr. et al., the disclosures of which are incorporated herein by reference.

FIELD OF THE INVENTION

This invention relates to digital color image processing and, more particularly, to correcting for chrominance interpolation artifacts.

BACKGROUND OF THE INVENTION

With the advent of digital cameras, it is becoming more and more advantageous to capture images as colored digital images. Colored digital images are frequently stored in three color planes such as red, green, and blue, or cyan, magenta, and yellow. In image processing, these colored digital images luminance and and chrominance color coordinates are quite useful because they express color in a similar fashion to the way the human visual system operates. As is well known, luminance, the black and white portion of an image, determines the sharpness of such image while the chrominance values determines its colorfulness.

Color interpolation between pixels can reduce the noise level in the luminance channel, but not without the expense of increasing noise in the chrominance channel. As is also well known to those skilled in the art, generally three channels are used to describe a color. For example, if an image is recorded having red, green, and blue channels, this can be converted to one luminance channel and two chrominance channels such as Y, Cr, Cb. These luminance and two chrominance channels facilitate certain aspects of digital image processing.

In addition to accumulating noise in the chrominance channels, the process of color interpolation can also introduce interpolation error. Such effects are most likely to occur in regions of an image having both high contrast and high spatial frequency content. Stated differently, such regions of an image contain color values which change quickly and change by large amounts. The high degree of variability in all color values reduces their mutual spatial correlation which, in turn, undercuts the basis of the color interpolation algorithm and degrades its performance.

Furthermore, if the chrominance errors occur in a region where the true image content consists largely of neutral shades of gray, they will produce color speckles that are easily seen as objectionable image artifacts. Consequently, the most noticeable aspects of chrominance errors can be avoided by reducing chrominance in high contrast regions of an image.

SUMMARY OF THE INVENTION

It is an object of the present invention to correct for chrominance interpolation artifacts.

This object is achieved by a method for correcting chrominance interpolation artifacts in a digital color image having color pixels in which each colored pixel is expressed as one luminance and two chrominance color values, such method comprising the steps of:

a) computing a test value at each pixel which indicates the presence of a high contrast luminance feature; and b) adjusting the chrominance values at pixels in accordance with the computed test value to correct for chrominance interpolation artifacts.

ADVANTAGES

It has been determined that chrominance interpolation artifacts are highly correlated with rapidly changing luminance features. The present invention recognizes luminance Laplacians and adjusts chrominance values in accordance therewith. The chrominance values are, where appropriate, reduced and therefore the color content is desaturated depending upon the relative value of the computed test value and the luminance value.

BRIEF DESCRIPTION OF THE DRAWINGS

FIG. 3 shows a detailed block diagram of the chrominance values block 34 shown in FIG. 2;

FIG. 4 depicts a kernel using luminance values which compute test values in accordance with the present invention.

DETAILED DESCRIPTION OF THE INVENTION

Single-sensor electronic cameras employing color filter arrays are well known. Elements not specifically shown or described herein may be selected from those known in the art.

Figure 1:
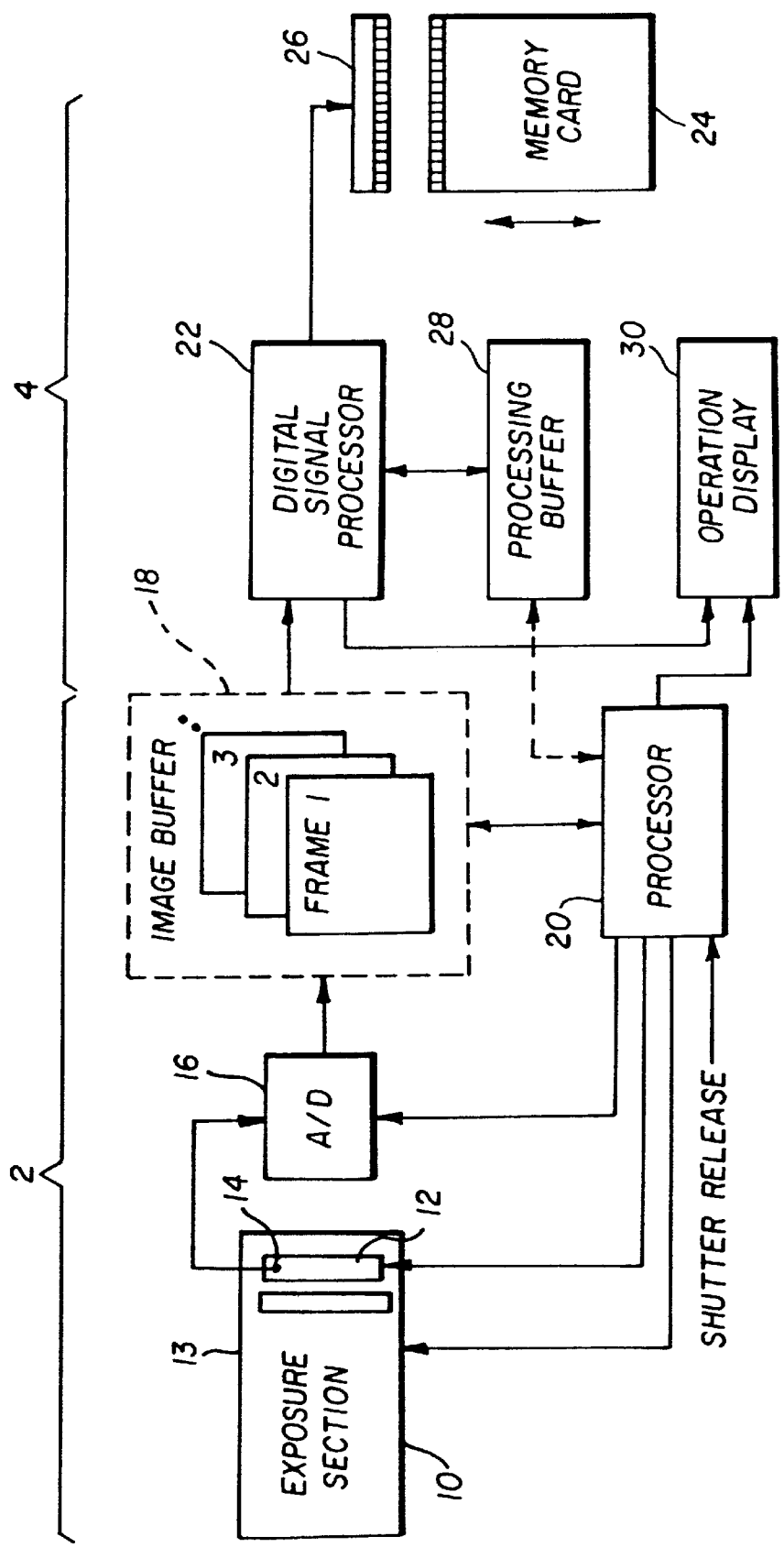
FIG. 1 is a block diagram of an electronic still camera employing interpolation processing according to the invention.
Figure 2:
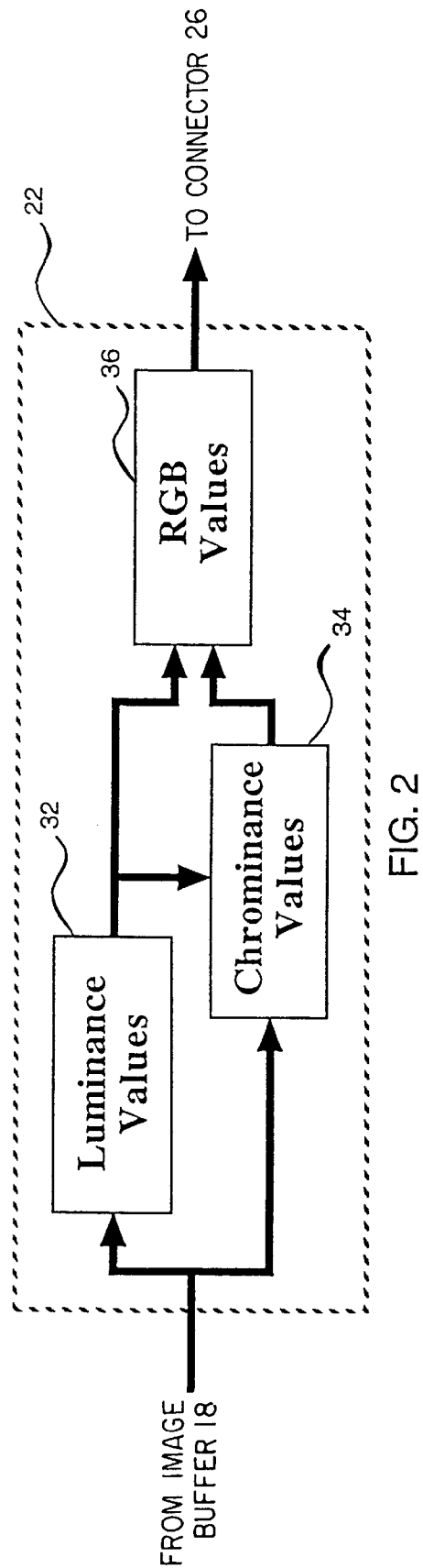
FIG. 2 is a block diagram of the logic of the interpolation processing technique for producing luminance in accordance with the invention.

Referring initially to FIGS. 1 and 2, an electronic still camera 1 is divided generally into an input section 2 and an interpolation and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The image sensor 12, which includes a two-dimensional array of colored photosites or pixels corresponding to picture elements of the image, can be a conventional charge-coupled device (CCD) using either well-known interline transfer or frame transfer techniques. The image sensor 12 is covered by a color filter array (CFA) 13. For an example of a color filter array which is particularly suitable for use in the present invention reference is made to commonly-assigned U.S. Pat. No. 5,631,703 to Hamilton et al., the disclosure of which is incorporated by reference. The image sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image value from the analog input signal for each picture element. The digital values are applied to an image buffer 18, which may be a random access memory (RAM) with storage capacity for a plurality of still images.

A control processor 20 generally controls the input section 2 of the electronic still camera 1 by initiating and controlling exposure ((by operation by the diaphragm and shutter (not shown) in the exposure section 10)), by generating the horizontal and vertical clocks needed for driving the image sensor 12 and for clocking image information therefrom, and by enabling the A/D converter 16 in conjunction with the image buffer 18 for each value segment relating to a picture element. The control processor 20 typically includes a microprocessor and appropriate memory coupled to a system timing circuit. Once a certain number of digital image values have been accumulated in the image buffer 18, the stored values are applied to a digital signal processor 22, which controls the throughput processing rate for the interpolation and recording section 4 of the electronic still camera 1. The digital signal processor 22 applies an interpolation algorithm to the digital image values, and sends the interpolated values to a conventional, removable memory card 24 via a connector 26. Although an electronic still camera 1 has been described as including a digital signal processor, it will be understood that the digital signal processor 22 does not have to be an integral part of the electronic still camera 1. A requirement of this invention is that the digital image values are provided from an image sensor.

Since the interpolation and related processing ordinarily occurs over several steps, the intermediate products of the processing algorithm are stored in a processing buffer 28. The processing buffer 28 may also be configured as part of the memory space of the image buffer 18. The number of image values needed in the image buffer 18 before digital processing can begin depends on the type of processing, that is, for a neighborhood interpolation to begin, a block of values including at least a portion of the image values comprising a video frame must be available. Consequently, in most circumstances, the interpolation may commence as soon as the requisite block of picture elements is present in the buffer 18.

The input section 2 operates at a rate commensurate with normal operation of the electronic still camera 1 while interpolation, which may consume more time, can be relatively divorced from the input rate. The exposure section 10 exposes the image sensor 12 to image light for a time period dependent upon exposure requirements, for example, a time period between $\frac{1}{1000}$ second and several seconds. The image charge is then swept from the photosites in the image sensor 12, converted to a digital format, and written into the image buffer 18. The driving signals provided by the control processor 20 to the image sensor 12, the A/D converter 16 and the buffer 18 are accordingly generated to achieve such a transfer. The processing throughput rate of the interpolation and recording section 4 is determined by the speed of the digital signal processor 22.

One desirable consequence of this architecture is that the processing algorithm employed in the interpolation and recording section may be selected for quality treatment of the image rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the image buffer 18 shown in FIG. 1 provides for storage of a plurality of images, in effect allowing a series of images to "stack up" at video rates. The size of the buffer is established to hold enough consecutive images to cover most picture-taking situations.

An operation display panel 30 is connected to the control processor 20 for displaying information useful in operation of the electronic still camera 1. Such information might include typical photographic data, such as shutter speed, aperture, exposure bias, color balance (auto, tungsten, fluorescent, daylight), field/frame, low battery, low light, exposure modes (aperture preferred, shutter preferred), and so on. Moreover, other information unique to this type of electronic still camera 1 is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

The digital signal processor 22 interpolates each still video image stored in the image buffer 18 according to the interpolation technique shown in FIG. 2. The interpolation of missing data values at each pixel location follows the sequence shown in FIG. 2, as will later be discussed.

In the implementation shown in FIG. 2, the digital signal processor 22 provides an adaptive interpolation technique to provide a compute luminance function shown as luminance values block 32 for computing luminance values. After the luminance values are computed then a chrominance values block 34 computes the chrominance values of each pixel based upon the computed final luminance values. Finally an RGB values block 36 computes the image in Red(R), Green(G), Blue(B) format which are used for an image display or for making a hard copy output. Although this disclosure is in reference to computing red, green, and blue values, it will be understood that it is also applicable to other color spaces such as cyan, magenta, and yellow. Another color space that can be used is to use luminance and chrominance values which are typically referred to as YCC color spaces. The Y refers to luminance and the two C's refer to chrominance. Luminance values are computed as shown in FIG. 2 in the digital signal processor of FIG. 1 as is well known in the art. Likewise, chrominance values are computed in the initial chrominance block 52 (FIG. 3) according to well known techniques. For a more complete description of the computation of such luminance and chrominance values, reference can be made to commonly assigned U.S. patent application Ser. No. 09/096,632, filed Jun. 12, 1998, entitled "Computing Color Specification (Luminance and Chrominance) Values for Images" to John F. Hamilton, Jr. et al.

The other two blocks of FIG. 3, the luminance Laplacian block 54 and the modify chrominance block 56, will now be described in detail. Luminance Laplacian block 54 makes use of a Laplacian kernel such as the 5×5 kernel shown in FIG. 4. For any given pixel which is selected as the center pixel of a 5×5 kernel it is assigned value weight of 4. Pixels which surround the kernel of interest are also assigned different values. These values shown in FIG. 4 are representative and those skilled in the art will appreciate that other values can be selected which will also provide a useful Laplacian value. For purposes of this disclosure, the term Laplacian will refer to any second-order central difference of color values. The absolute value of a luminance Laplacian value tends to be large near a high contrast luminance feature such as a high contrast edge, cusp, or point in an image. The following equations depict how these kernel values are used to compute a luminance Laplacian value for each pixel in a digital image.

Figure 5:
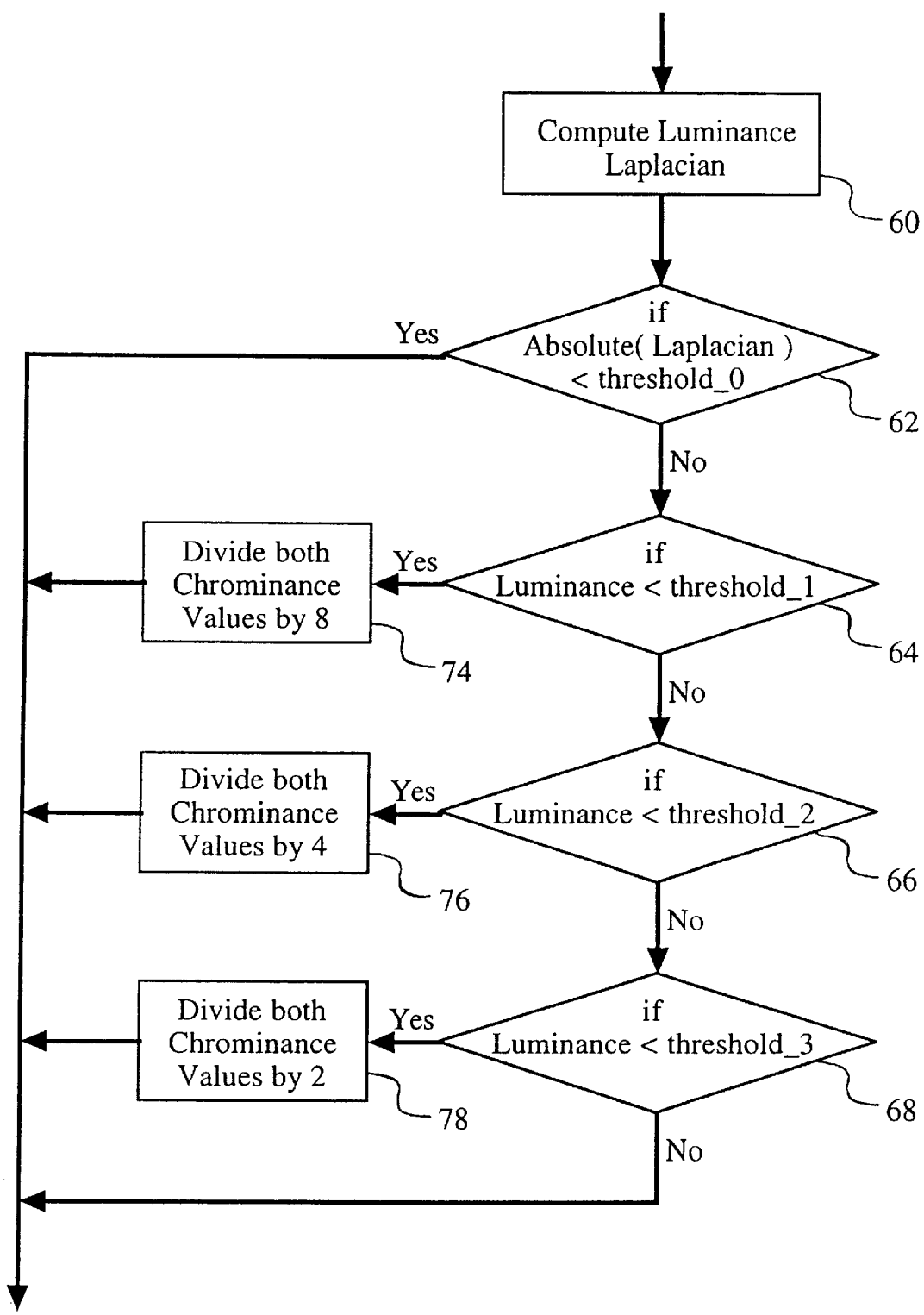
FIG. 5 depicts a flow chart of the computation used to correct for chrominance interpolation artifacts which can be incorporated in a computer program found in the digital signal processor 22 shown in FIG. 1 (more particularly, block 54 of FIG. 3).

If the luminance values around position 33 are:

$A_{11}\ A_{12}\ A_{13}\ A_{14}\ A_{15}$
$A_{21}\ A_{22}\ A_{23}\ A_{24}\ A_{25}$
$A_{31}\ A_{32}\ A_{33}\ A_{34}\ A_{35}$
$A_{41}\ A_{42}\ A_{43}\ A_{44}\ A_{45}$
$A_{51}\ A_{52}\ A_{53}\ A_{54}\ A_{55}$ then the following equations show how the Laplacian kernel values of FIG. 4 are used to produce the luminance Laplacian value $B_{33}$ for the center pixel above. The luminance Laplacian value is computed in block 60 of FIG. 5.

$$B_{33} = ( \\ -1*A_{23} \\ -1*A_{23} + 4*A_{23} - 1*A_{23} \\ -1*A_{23} \\ )$$

Once computed, the luminance Laplacian value for each pixel is passed to the modify chrominance block 56 as are the chrominance values from initial chrominance block 52. Each pixel's luminance Laplacian causes its chrominance values to be modified according to the logical flow diagram shown in FIG. 5. Referring to block 62 of FIG. 5, the absolute value of the luminance Laplacian value $ABS(B_{33})$ is then compared to a specified value threshold_0 (for example, the value 20). If $ABS(B_{33})$ is less than threshold_0, no changes are made in the pixel's chrominance values. However, if $ABS(B_{33})$ equals or exceeds threshold_0, the pixel's luminance value is compared (see block 64) to another specified value threshold_1 (for example, the value 25). If the luminance value is less than threshold_1, both of the pixel's chrominance values are divided by 8 (see block 74). If not, another comparison (see block 66) is made between the pixel's luminance value and a specified value threshold_2 (for example, the value 50). If the luminance value is less than threshold_2, both of the pixel's chrominance values are divided by 4 (see block 76). If not, another comparison (see block 68) is made between the pixel's luminance value and a specified value threshold_3 (for example, the value 100). If the luminance value is less than threshold_3, both of the pixel's chrominance values are divided by 2 (see block 78). If not, the luminance value is large enough that nothing needs to be done. One skilled in the art will recognize that these threshold values, which were given for an 8-bit representation of color values, need to be adjusted if 10-bit or 12-bit image color values are used.

The present invention can be embodied in a computer program stored on a computer readable product such as, for example, magnetic storage media, such as a magnetic disk (for example, a floppy disk), magnetic tape, optical disks, optical tape, or machine readable memory.

The digital signal processor 22 shown in FIG. 1 includes a readable storage medium which may, for example, comprise magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST

2 input section
4 recording section
10 exposure section
12 image sensor
13 color filter array
14 output diode
16 A/D converter
18 image buffer
20 control processor
22 digital signal processor
24 removable memory card
26 connector
28 processing buffer
30 display panel
32 luminance values block
34 chrominance values block
36 RGB values block
52 initial chrominance block
54 luminance Laplacian block
56 modify chrominance block
60 compute luminance Laplacian
62 absolute (Laplacian) threshold
64 luminance threshold
66 luminance threshold
68 luminance threshold
74 chrominance values
76 chrominance values
78 chrominance values

What is claimed is:

1. A method for correcting chrominance interpolation artifacts in a digital color image having color pixels in which each colored pixel is expressed as one existing luminance value and existing two chrominance color values, such method comprising:

computing a test value at each pixel which indicates the presence of a high contrast luminance feature; and adjusting the existing chrominance values at pixels in accordance with the computed test value to correct for chrominance interpolation artifacts.

2. The method of claim 1 wherein a kernel having weighted values is used in determining the test value.

3. The method of claim 2 wherein when there are ranges of values which correspond to no correction and different levels of reduction of the chrominance values and when a computed test value is within one of such ranges, the corresponding correction is made.

4. A computer program product comprising a computer storage medium having a computer program stored therein for correcting chrominance interpolation artifacts in a digital color image having color pixels in which each colored pixel is expressed as one existing luminance value and two existing chrominance color values, the program performing:

computing a test value at each pixel which indicates the presence of a high contrast luminance feature; and adjusting the existing chrominance values at pixels in accordance with the computed test value to correct for chrominance interpolation artifacts.

\* \* \* \* \*